(12) United States Patent
Friedlander et al.

(10) Patent No.: US 8,677,154 B2
(45) Date of Patent: Mar. 18, 2014

(54) PROTECTING SENSITIVE DATA IN A TRANSMISSION

(75) Inventors: Robert R. Friedlander, Southbury, CT (US); Richard Hennessy, Austin, TX (US); James R. Kraemer, Santa Fe, NM (US); Edward J. Macko, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 13/285,407

(22) Filed: Oct. 31, 2011

(65) Prior Publication Data
US 2013/0111220 A1 May 2, 2013

(51) Int. Cl.
*G06F 11/30* (2006.01)
*G06F 12/14* (2006.01)

(52) U.S. Cl.
USPC .......................................................... 713/193

(58) Field of Classification Search
USPC .......................................................... 713/193
See application file for complete search history.

(56) References Cited

U.S. PATENT DOCUMENTS

| | | | |
|---|---|---|---|
| 5,197,137 A * | 3/1993 | Kumar et al. ................ | 718/107 |
| 6,961,849 B1 | 11/2005 | Davis et al. | |
| 7,689,837 B2 * | 3/2010 | Taguchi et al. ............... | 713/193 |
| 7,702,605 B2 | 4/2010 | Friedlander et al. | |
| 7,899,189 B2 * | 3/2011 | Dawson et al. ............... | 380/284 |
| 2003/0182568 A1 | 9/2003 | Snapp et al. | |
| 2004/0054939 A1 | 3/2004 | Guha et al. | |
| 2005/0259816 A1 | 11/2005 | Han et al. | |
| 2007/0033398 A1 | 2/2007 | Robertson et al. | |
| 2007/0079117 A1 | 4/2007 | Bhogal et al. | |
| 2008/0189286 A1 | 8/2008 | Choi et al. | |
| 2008/0222734 A1 * | 9/2008 | Redlich et al. ................ | 726/26 |
| 2009/0019425 A1 | 1/2009 | Archambault et al. | |
| 2010/0095127 A1 | 4/2010 | Banerjee et al. | |
| 2012/0303558 A1 * | 11/2012 | Jaiswal ......................... | 706/12 |

FOREIGN PATENT DOCUMENTS

| | | |
|---|---|---|
| JP | 2011180839 A | 9/2011 |
| WO | 2011043418 A | 4/2011 |

OTHER PUBLICATIONS

M. Abomhara et al., "Enhancing Selective Encryption for H.264/AVC Using Advanced Encryption Standard", International Journal of Computer Theory and Engineering, vol. 2, No. 2, Apr. 2010, 1793-8201, pp. 223-229.
E. Damiani et al., "Selective Data Encryption in Outsourced Dynamic Environments", Electronic Notes in Theoretical Computer Science (ENTCS) vol. 168, Feb. 2007, pp. 1-15.
X. Liu et al., "Selective Encryption of Multimedia Content in Distribution Networks: Challenges and New Directions", Conf. Communications, Internet, and Information Technology, (CIIT 2003) 2003, Scottsdale, AZ, USA, pp. 1-10.
International Search Report for PCT/IB2012/055327, dated Jan. 15, 2013, 3 pages.

* cited by examiner

*Primary Examiner* — William Powers
*Assistant Examiner* — Stephen Sanders
(74) *Attorney, Agent, or Firm* — John R. Pivnichny; Law Office of Jim Boice (57) ABSTRACT

A processor-implemented method, system, and/or computer program product protects sensitive data in a received transmission. A network interface receives a data transmission, which includes multiple units of data. Any sensitive data in the received data transmission is identified by the recipient according to a pre-determined rule. Identified sensitive data from the data transmission is then encrypted.

20 Claims, 3 Drawing Sheets

PROTECTING SENSITIVE DATA IN A TRANSMISSION

BACKGROUND

The present disclosure relates to the field of computers, and specifically to the use of computers in data transmission. Still more particularly, the present disclosure relates to the use of computers in protecting data that is received from another computer system.

Received data in a data transmission may come in the form of an upload, an e-mail, a text message, an instant messaging message, etc. While the data may represent audio, visual or other media, a common format of data is text data, which is often sensitive and yet unprotected. Thus, a receiving user may see sensitive data that is inappropriate for that user's viewing.

SUMMARY

A processor-implemented method, system, and/or computer program product protects sensitive data in a received transmission. A network interface receives a data transmission, which includes multiple units of data. Any sensitive data in the received data transmission is identified by the recipient according to a pre-determined rule. Identified sensitive data from the data transmission is then encrypted.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
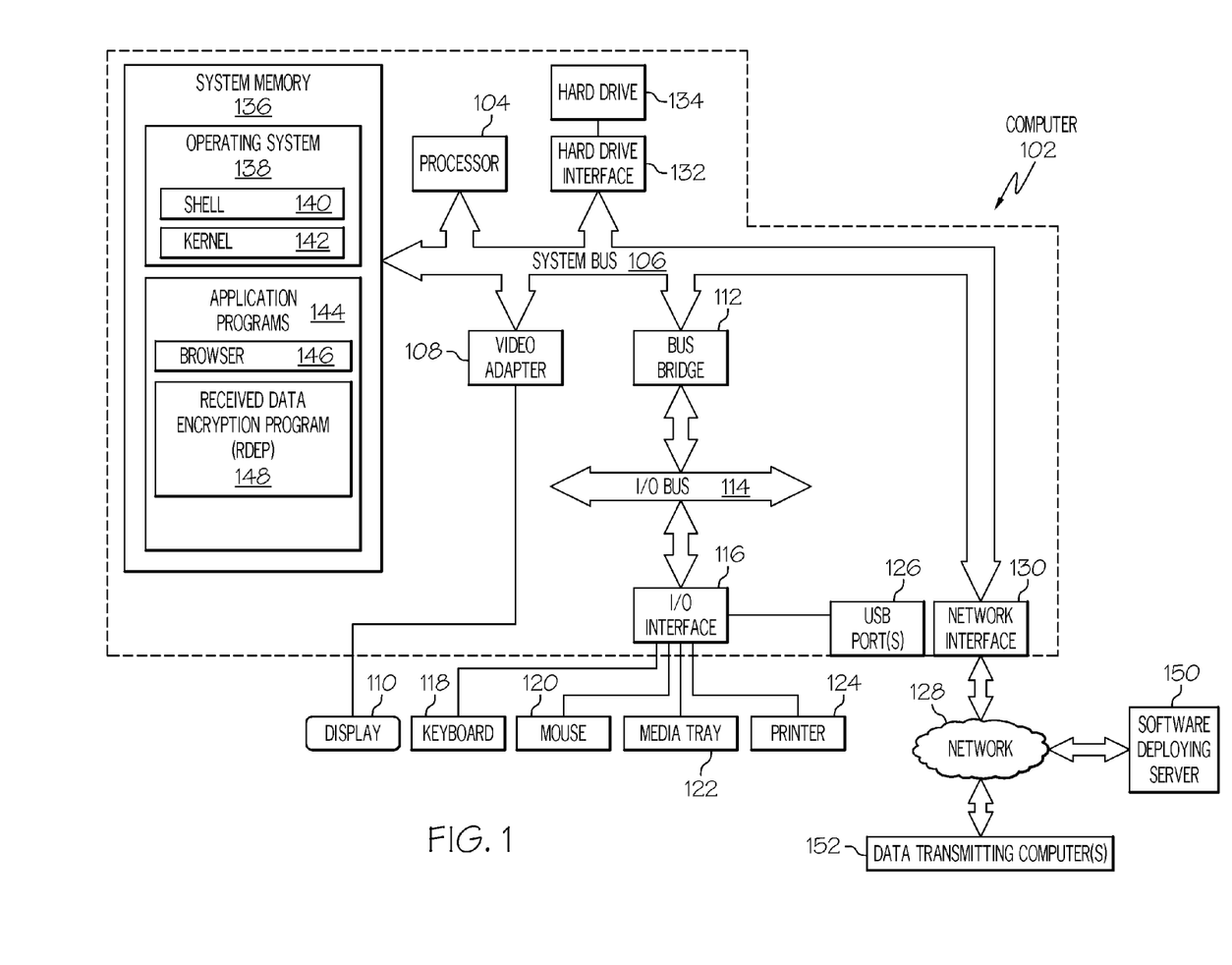
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150 and data transmitting computer(s) 152.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a received data encryption program (RDEP) 148. RDEP 148 includes code for implementing the processes described below, including those described in FIGS. 2-3. In one embodiment, computer 102 is able to download RDEP 148 from software deploying server 150, including in an on-demand basis, wherein the code in RDEP 148 is not downloaded until needed for execution. Note further that, in one embodiment of the present invention, software deploying server 150 performs all of the functions associated with the present invention (including execution of RDEP 148), thus freeing computer 102 from having to use its own internal computing resources to execute RDEP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note further that the architecture shown in FIG. 1 for computer 102 and/or data transmitting computer(s) 152 may be utilized by a personal digital assistant (PDA), "smart phone", tablet computer, or any other device that is capable of sending and/or receiving data messages.

Figure 2:
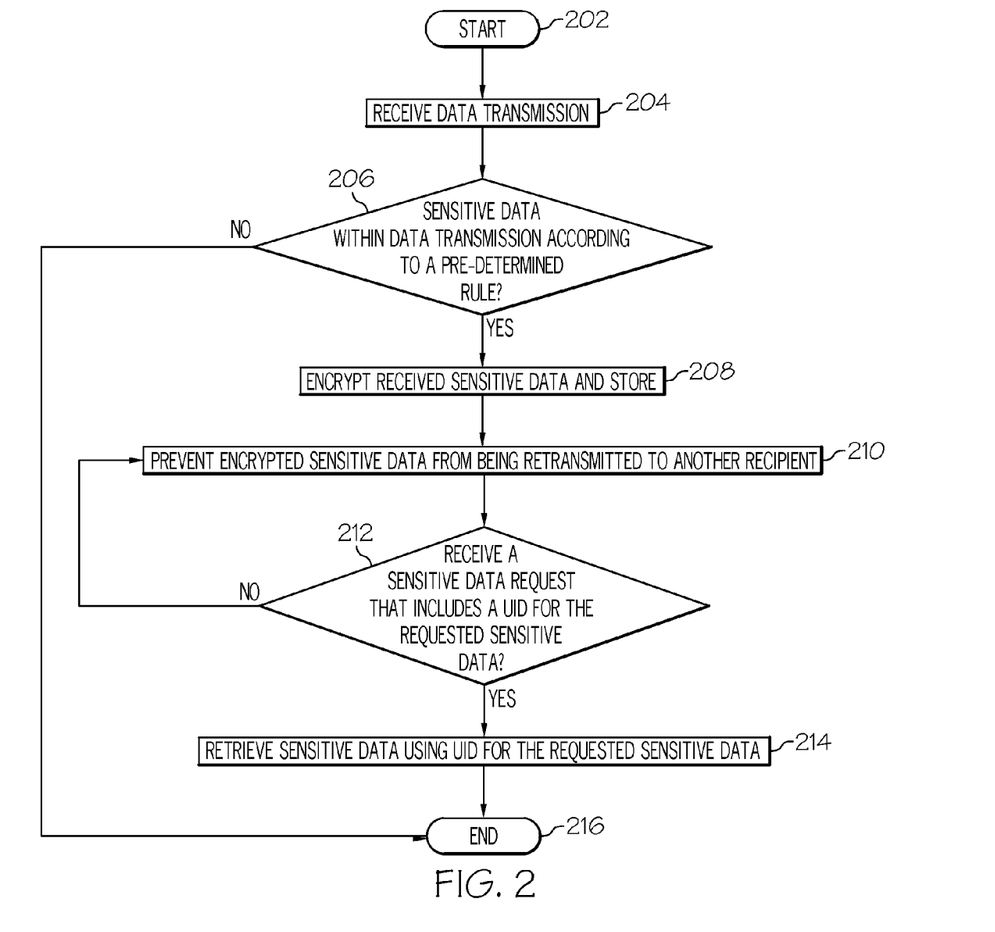
FIG. 2 is a high level flow chart of one or more exemplary steps taken by a processor to selectively protect sensitive data that is part of a received transmission.

Referring now to FIG. 2, a high level flow chart of one or more exemplary steps taken by a processor to selectively protect sensitive data in a received transmission is presented. After initiator block 202, a data transmission is received (e.g., by a hardware network interface such as network interface 130 shown in FIG. 1) from another computer system (e.g., from one of the data transmitting computers 152 shown in FIG. 1), as described in block 204. This data transmission may be an e-mail message, a web-based or portal-based message, a text message (e.g., if the receiving system is a "smart phone"), an instant messaging (IM) message, etc.

As depicted in query block 206, a query is made as to whether the data transmission includes sensitive data, as determined by a pre-determined rule. If so, then the sensitive data is encrypted (block 208), and optionally is stored. In one embodiment, the encryption of the sensitive data results in a presentation of the sensitive data being redacted before being displayed to a viewer.

First, note that the determination of whether the data is sensitive or not, as well as a subsequent encryption, is performed by the recipient of the data transmission, not the sender of the data transmission. That is, the sender may be able to attach some type of data marker indicating that some or all of the data transmission is sensitive, and thus in need of encryption. However, the present invention does not utilize such a data marker. Rather, the determination as to whether any part of the data transmission is sensitive is made according to one or more pre-determined rules used by the recipient. This provides a significant improvement over the prior art, since it is the recipient, not the sender, that decides whether data is sensitive or not. For example, assume that the sender does not think that there is anything sensitive about a person's marital status. However, the recipient may be in a human resources department, whose policies prohibit discriminatory practices based on the person's marital status. The present invention ensures that this information is not conveyed to a message-receiving department, since such sensitive information is encrypted and/or redacted before it is viewed.

Figure 3:
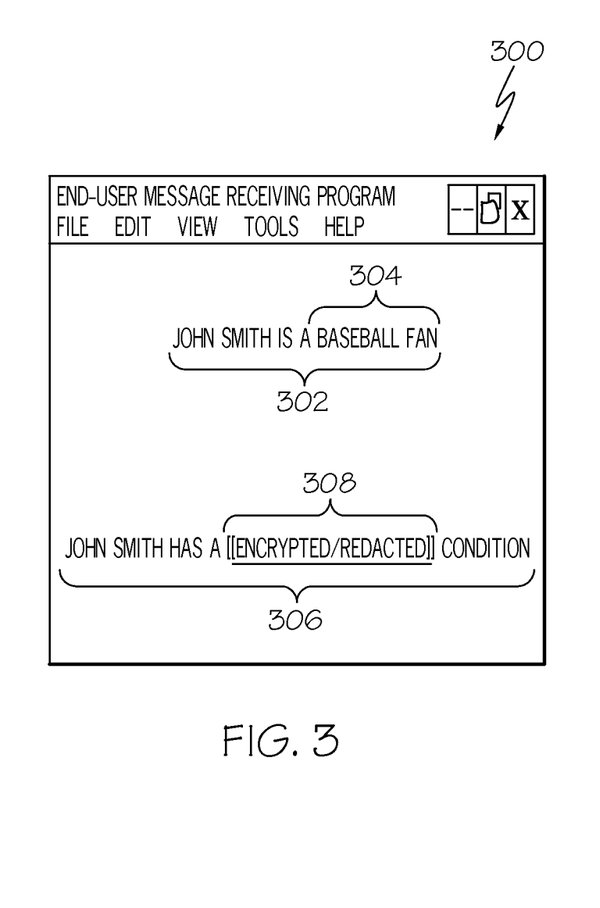
FIG. 3 depicts an exemplary user interface on a computer system that receives transmitted data.

For example, consider the user interface (UI) 300 shown in FIG. 3. UI 300 is displayed to a recipient of a message. The set of data 302 states that a person ("John Smith") is a "baseball fan", as illustrated by element 304. Assuming that no predetermined rule deems a person's affinity for a particular sport to be sensitive, "baseball fan" (element 304) is displayed unencrypted on the UI 300. However, the sender of the message also includes the data 306 that states that "John Smith" has a condition that a pre-determined rule used by/applied to the recipient has deemed to be sensitive, such as a medical condition, marital status, etc. Although the sender of the data 306 may not have considered this information to be sensitive, the rule-based system on the recipient's side will redact and/or encrypt the sensitive element 308. If element 308 is redacted, then it will simply be removed from the display of the UI 300; if element 308 is encrypted, then it will appear in an encrypted form on the display of the UI 300.

Second, note that the decision on the recipient's part as to whether certain data is sensitive or not is not based just on the data itself (or metadata that describes the data), but rather is based on a rule as to whether certain data is sensitive or not. That is, the present invention does not merely use a lookup table to identify sensitive words, but uses more complex pre-determined rules to determine if a set of data/words is sensitive, either at the time of reception or, in various embodiments, at other times. Exemplary and novel embodiments of one or more such pre-determined rules are described below.

In one embodiment, a data set rule states that sensitive data is part of a set of sensitive data. For example, assume that a set of sensitive data includes a person's name, phone number, address, age, and driver's license identification number. By knowing only the person's name and phone number, it will be impossible to obtain other secure/sensitive information about the person, such as their credit score. However, if the recipient already knows more information about that person, including that person's address, age, and/or driver's license identification number, then the recipient can query a credit bureau in order to learn person's credit score. Thus, in this embodiment, the identified sensitive data (e.g., the person's name) is part of a set of sensitive data. A processor identifies that person's name as being sensitive data according to a data set rule, which defines currently received data (e.g., the person's name) as being sensitive only if a predetermined amount of other data from the set of sensitive data (i.e., that person's age and driver's license identification number) has been previously received, and wherein additional information (e.g., a credit score) about a subject of the set of sensitive data can only be obtained by utilizing the identified sensitive data plus the predetermined amount of other data from the set of sensitive data.

In one embodiment, data is determined to be sensitive according to a composite data rule. In this embodiment, identified sensitive data (determined in query block 206) is part of a set of sensitive data. An exemplary set of sensitive data may be a name of a credit card holder, an account number for that credit card, and a security code for that credit card. Assume in this example that the security code is the identified sensitive data. Without the name of the credit card holder and the account number for that credit card, there is nothing inherently sensitive about the security code for that credit card. However, if name of the credit card holder and the account number for that credit card are subsequently received, then the security code for that credit card is retroactively deemed to be sensitive, and is encrypted/redacted accordingly. Thus, in this example, a hardware network interface receives a first set of data (e.g., the security code for the credit card); the processor initially determines that the first set of data is not sensitive according to the predetermined rule (i.e., the security code is not sensitive without the other information about the credit card); the hardware network interface subsequently receives a second set of data (e.g., the name of the credit card holder and/or the account number for the credit card); and the processor determines that the first set of data is now sensitive according to a retroactive data rule, wherein the retroactive data rule defines the first set of data as being sensitive in response to the second set of data being received. Note that in this embodiment (which utilizes the retroactive data rule), the process retroactively deems previously received data to be sensitive. In the embodiment above (which utilized the data set rule), the currently received data is immediately deemed sensitive when combined with previously received data.

In one embodiment, an adversity rule identifies how adverse it will be to a particular entity if sensitive data is not encrypted/redacted. For example, assume that in one scenario that the sensitive data describes security codes, operating pressures, and personnel schedules for a nuclear power plant. If this information were to be known by a message recipient, then according to the adversity rule, that message recipient would be in possession of enough information to sabotage the power plant. In this scenario, the adversity rule would require that a strictest/highest level of encryption would be applied to such sensitive data. However, if the sensitive data were merely a listing of favorite musical artists of a person, release of such information would likely have little adverse effect on that person or anybody else, and thus the adversity rule would allow a lax/low level of encryption to be used. Thus, in this embodiment, where failure to encrypt the identified sensitive data has been predetermined to result in adversity to a particular entity, the processor determines an adversity level (e.g., high or low) of the adversity (e.g., a negative impact on that entity) according to the adversity rule. Based on this determined adversity level, the processor adjusts a level of encryption of the identified sensitive data.

In one embodiment, the pre-determined rule is based on how susceptible the device, which receives the data transmission, is to being physically compromised. For example, assume that the receiving device is a smart phone or a tablet computer. Such devices are easily lost or stolen, and thus the data that resides on them is also easily lost or stolen. Similarly, data on a desktop computer that is in an unsecured, public access area is susceptible to being compromised. Based on a security rule for such systems, the level of encryption is adjusted accordingly. That is, the security rule would dictate that a tablet computer receives more stringent encryption/redaction of received sensitive data than a server or a desktop, particularly a server/desktop in a secure area. Thus, in this embodiment, in which the hardware network interface that received the data transmission is a component of a computer system, the processor determines a level of risk that the computer system (e.g., smart phone, tablet computer, desktop computer, etc.) will be physically compromised (lost or stolen). Based on the determined level of risk that the computer system will be physically compromised, the processor adjusts a level of encryption of the identified sensitive data according to the security rule.

In one embodiment, the pre-determined rule is based on the identified sensitive data describing a member of a cohort (i.e., a predefined group of entities). For example, assume that a first cohort only has two members, one male and one female. If a recipient of the data transmission knows who is in that cohort, then simply receiving a data transmission that includes the gender of the person will allow the recipient to realize that the rest of the data transmission is related to that particular person, even if that person's name was not in the data transmission. However, if the cohort has a million members, with an equal number of male and female members, then knowing the gender of a person will not be useful in identifying a particular person. Thus, in this embodiment, the identified sensitive data describes a single member of a cohort (e.g., the data describes that member's gender). In this scenario/embodiment, the processor adjusts a level of encryption of the identified sensitive data according to a size of the cohort, such that identified sensitive data that describes a member of a first cohort (e.g., having just two members) receives more stringent encryption than identified sensitive data that describes a member of a second cohort (e.g., having a million members) based on the second cohort being larger than the first cohort.

In one embodiment, the pre-determined rule is based on how expensive it is to encrypt/redact the sensitive data now compared to doing so later, particularly in consideration of whether the data is time sensitive. For example, a first message may mention that an entity plans to place a bid on a particular contract (i.e., a work contract, a purchase, etc.). Assume that future messages will reference this first message. By encrypting the information that identifies the contract now, then only that small amount of information (i.e., to whom the entity will be placing a bid) needs to be encrypted. However, if that information is not encrypted/redacted by the recipient, then when additional messages (which refer back to the first data message/transmission) are received, then all of that information will need to be encrypted, since the initial message is accessible to any recipient/reader. Thus, encrypting multiple subsequent messages (and likely most of the message, in order to prevent an unauthorized party from deducing the context of the message) is much more expensive than simply encrypting the first message, which held the base sensitive information (the name of the contact/party). Thus, in this embodiment, the processor, in response to determining that currently encrypting the identified sensitive data is less expensive than encrypting the identified sensitive data later, currently encrypts the identified sensitive data.

In one embodiment, the pre-determined rule is based on how perishable the received data is. For example, assume that the received data describes a product that will be made public in two weeks. Assume also that two encryption processes are available. The first encryption process is cheap, but can be broken by most hackers in four weeks. The second encryption process is more expensive, but cannot be broken in less than a year. Thus, it is not fiscally reasonable to use the second encryption process, since the information in the data transmission only needs to be secured for two weeks. Thus, in this embodiment, in which a first encryption process is less expensive and has a shorter encryption lifespan than a second encryption process, the processor, in response to determining that the shorter encryption lifespan provides encryption protection beyond a predetermined requisite level (e.g., two weeks), encrypting the identified sensitive data by using the first encryption process (which provides an adequate four weeks of protection).

Returning to block 208 of FIG. 2, the encrypted sensitive data is stored in one or more storage devices. In one embodiment, this storage is performed using different storage devices, and according to different encryption algorithms. For example, assume that the received data transmission includes a first set of data and a second set of data. According to the pre-determined rule, the first set of data is encrypted with a first encryption algorithm that has been predetermined to be appropriate/optimal for that type of data, while the second set of data is encrypted with a second encryption algorithm that has been predetermined to be appropriate/optimal for the other type of data. For example, lengthy strings of medical records may be optimally encrypted/redacted using an RSA (named for Rivest, Shamir and Adleman) encryption algorithm, while shorter data (e.g., a patient's name) may be encrypted with a simpler block encryption algorithm. Once encrypted, the different sets of data are stored in different storage devices, each of which may be reserved for data that has been encrypted by a particular algorithm. That is, in this example a particular storage device stores only data that contains patient names, which have been encrypted using a particular block encryption algorithm, while another storage device stores only medical records, which have been encrypted using the RSA encryption algorithm. Thus, in this embodiment, the received data transmission includes a first set of data and a second set of data. The processor encrypts the first set of data with a first encryption algorithm, and then transmits the encrypted first set of data to a first storage device. In one embodiment, the processor has reserved this first storage device for a first type of data, such that only the first type of data is allowed to be stored in the first storage device. The processor encrypts the second set of data with a second encryption algorithm, which is different from the first encryption algorithm. The processor transmits the encrypted second set of data to a second storage device, which is different from the first storage device. In one embodiment, the processor has reserved the second storage device for a second type of data, which is the data type of the second set of data. Thus, only the second type of data is allowed to be stored in the second storage device.

Returning to FIG. 2, in one embodiment, the sensitive data, whether encrypted or unencrypted, is prevented from being retransmitted to another recipient (block 210). Thus, in this embodiment, the processor executes computer code that prevents the identified sensitive data and/or the encrypted identified sensitive data from being retransmitted to another recipient. However, if the requester knows the unique identifier (UID) for the requested data (described below), then the requested data may be sent to that requester.

Thus, as described in query block 212 and block 214, if a request for data includes a requisite UID, then the requested data will be retrieved, decrypted, and sent to the requester. In an example of this embodiment, the processor has assigned a first UID to the encrypted first set of data and a second UID to the encrypted second set of data. The processor then receives, from a requester, a request for the first set of data. Note that this request includes the first UID to identify the encrypted first set of data. The processor also receives a request for the second set of data. This request for the second set of data includes the second UID to identify the encrypted second set of data. In response to receiving the first UID and the second UID, the processor then retrieves and decrypts the encrypted first set of data and the encrypted second set of data, and then transmits the decrypted first set of data and the decrypted second set of data to the requester. The process ends at terminator block 216.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A processor-implemented method of protecting sensitive data in a received transmission, the processor-implemented method comprising:
    a hardware network interface receiving a data transmission; and
    a processor identifying sensitive data from the data transmission according to a data set rule, wherein identified sensitive data is part of a set of sensitive data, wherein the data set rule defines currently received data as being sensitive only if a predetermined amount of other data from the set of sensitive data has been previously received, and wherein additional information about a subject of the set of sensitive data can only be obtained by utilizing the identified sensitive data plus the predetermined amount of other data from the set of sensitive data.

2. The processor-implemented method of claim 1, further comprising:
    the processor identifying the sensitive data without a use of a sensitive data marker from a sender of the data transmission, wherein the sensitive data marker identifies the sensitive data.

3. The processor-implemented method of claim 1, further comprising:
    the processor encrypting the identified sensitive data from the data transmission.

4. The processor-implemented method of claim 1, further comprising:
    the processor redacting the identified sensitive data from the data transmission.

5. The processor-implemented method of claim 3, wherein failure to encrypt the identified sensitive data has been predetermined to result in adversity to a particular entity, and wherein the processor-implemented method further comprises:
    the processor determining an adversity level of the adversity; and
    the processor adjusting a level of encryption of the identified sensitive data according to an adversity rule, wherein the adversity rule directs adjusting the level of encryption according to the determined adversity level.

6. The processor-implemented method of claim 3, wherein the hardware network interface is a component of a computer system, and wherein the processor-implemented method further comprises:
    the processor determining a level of risk that the computer system will be physically compromised by receiving the sensitive data in the data transmission; and
    the processor adjusting a level of encryption of the identified sensitive data according to a security rule, wherein the security rule directs adjusting the level of encryption based on the determined level of risk that the computer system will be physically compromised.

7. The processor-implemented method of claim 3, wherein the identified sensitive data describes a single member of a cohort, and wherein the processor-implemented method further comprises:
    the processor adjusting a level of encryption of the identified sensitive data according to a size of the cohort, wherein identified sensitive data that describes a member of a first cohort receives more stringent encryption than identified sensitive data that describes a member of a second cohort based on the second cohort being larger than the first cohort.

8. The processor-implemented method of claim 3, further comprising:
    the processor, in response to determining that currently encrypting the identified sensitive data is less expensive than encrypting the identified sensitive data later, currently encrypting the identified sensitive data.

9. The processor-implemented method of claim 3, wherein a first encryption process is less expensive and has a shorter encryption lifespan than a second encryption process, and wherein the processor-implemented method further comprises:
    the processor, in response to determining that the shorter encryption lifespan provides encryption protection beyond a predetermined requisite level, encrypting the identified sensitive data by using the first encryption process.

10. The processor-implemented method of claim 1, wherein the received data transmission comprises a first set of data and a second set of data, and wherein the processor-implemented method further comprises:
- the processor encrypting the first set of data with a first encryption algorithm;
- the processor transmitting the encrypted first set of data to a first storage device;
- the processor encrypting the second set of data with a second encryption algorithm, wherein the second encryption algorithm and the first encryption algorithm are different algorithms; and
- the processor transmitting the encrypted second set of data to a second storage device, wherein the first storage device and the second storage device are different storage devices.

11. The processor-implemented method of claim 10, further comprising:
- the processor reserving the first storage device for a first type of data, wherein the first set of data is of the first type of data, and wherein only the first type of data is allowed to be stored in the first storage device; and
- the processor reserving the second storage device for a second type of data, wherein the second set of data is of the second type of data, and wherein only the second type of data is allowed to be stored in the second storage device.

12. The processor-implemented method of claim 10, further comprising:
- the processor assigning a first unique identifier (UID) to the encrypted first set of data and a second UID to the encrypted second set of data;
- the processor receiving, from a requester, a request for the first set of data, wherein the request for the first set of data comprises the first UID to identify the encrypted first set of data;
- the processor receiving a request for the second set of data, wherein the request for the second set of data comprises the second UID to identify the encrypted second set of data;
- the processor, in response to receiving the first UID and the second UID, retrieving and decrypting the encrypted first set of data and the encrypted second set of data; and
- the processor transmitting the decrypted first set of data and the decrypted second set of data to the requester.

13. The processor-implemented method of claim 1, further comprising:
- the processor executing computer code that prevents the identified sensitive data from being retransmitted to another recipient.

14. The processor-implemented method of claim 3, further comprising:
- the processor executing computer code that prevents the encrypted identified sensitive data from being retransmitted to another recipient.

15. A computer program product for protecting sensitive data in a received transmission, the computer program product comprising:
- a non-transitory computer readable storage media;
- first program instructions to receive a first set of data;
- second program instructions to initially determine that the first set of data is not sensitive according to a pre-determined rule third program instructions to subsequently receive a second set of data; and
- fourth program instructions to determine that the first set of data is retroactively sensitive according to a retroactive data rule, wherein the retroactive data rule defines the first set of data as being sensitive in response to the second set of data being received; and wherein the first, second, third, and fourth program instructions are stored on the non-transitory computer readable storage media.

16. The computer program product of claim 15, further comprising:
- fifth program instructions to encrypt retroactively sensitive data from the first set of data and wherein the fifth program instructions are stored on the non-transitory computer readable storage media.

17. A computer system comprising:
- a central processing unit (CPU), a computer readable memory, and a non-transitory computer readable storage media;
- first program instructions to receive a data transmission;
- second program instructions to identify sensitive data from the data transmission according to a pre-determined rule
- third program instructions to determine a level of risk that the computer system will be physically compromised by the sensitive data in the data transmission;
- fourth program instructions to adjust a level of encryption of identified sensitive data according to a security rule, wherein the security rule directs adjusting the level of encryption based on a determined level of risk that the computer system will be physically compromised by the sensitive data in the data transmission; and
- fifth program instructions to encrypt the identified sensitive data from the data transmission at an adjusted level of encryption based on the determined level of risk that the computer system will be physically compromised by the sensitive data in the data transmission;
- and wherein the first, second, third, fourth, and fifth program instructions are stored on the non-transitory computer readable storage media for execution by the CPU via the computer readable memory.

18. The computer system of claim 17, wherein currently received data in the data transmission is part of a set of sensitive data, and wherein the computer system further comprises:
- sixth program instructions to identify the sensitive data according to a data set rule, wherein the data set rule defines currently received data as being sensitive only if a predetermined amount of other data from the set of sensitive data has been previously received, and wherein additional information about a subject of the set of sensitive data can only be obtained by utilizing the identified sensitive data plus the predetermined amount of other data from the set of sensitive data; and wherein the sixth program instructions are stored on the non-transitory computer readable storage media for execution by the CPU via the computer readable memory.

19. The computer system of claim 17, further comprising:
sixth program instructions to receive a first set of data;
seventh program instructions to initially determine that the first set of data is not sensitive according to the predetermined rule;
eighth program instructions to receive a second set of data; and
ninth program instructions to determine that the first set of data is now sensitive according to a retroactive data rule, wherein the retroactive data rule defines the first set of data as being sensitive in response to the second set of data being received; and wherein the sixth, seventh, eighth, and ninth program instructions are stored on the non-transitory computer readable storage media for execution by the CPU via the computer readable memory.

20. The computer system of claim 17, wherein the received data transmission comprises a first set of data and a second set of data, and wherein the computer system further comprises:
- sixth program instructions to encrypt the first set of data with a first encryption algorithm;
- seventh program instructions to transmit the encrypted first set of data to a first storage device that is physically remote from the processor, wherein the first set of data is of a first type of data, and wherein only the first type of data is allowed to be stored in the first storage device;
- eighth program instructions to encrypt the second set of data with a second encryption algorithm, wherein the second set of data is of a second type of data, wherein the second encryption algorithm and the first encryption algorithm are different algorithms; and
- ninth program instructions to transmit the encrypted second set of data to a second storage device, wherein the first storage device and the second storage device are different storage devices, and wherein only the second type of data is allowed to be stored in the second storage device; and
- wherein the sixth, seventh, eighth, and ninth program instructions are stored on the non-transitory computer readable storage media for execution by the CPU via the computer readable memory.

* * * * *